United States Patent [19]

Sanderson

[11] Patent Number: 5,421,239
[45] Date of Patent: Jun. 6, 1995

[54] SUPPORT PLANK-BASED EXTERNAL AIRCRAFT CARGO CARRYING APPARATUS

[76] Inventor: Paul H. Sanderson, 2019 Cripple Creek, Lewisville, Tex. 75067

[21] Appl. No.: 290,137

[22] Filed: Aug. 15, 1994

[51] Int. Cl.⁶ ............................................. F41A 23/00
[52] U.S. Cl. ................................. 89/37.22; 89/37.16
[58] Field of Search ................ 89/37.22, 37.19, 37.16, 89/1.54; 244/14

[56] References Cited

U.S. PATENT DOCUMENTS

| | | | |
|---|---|---|---|
| 2,372,728 | 4/1945 | Martin | 89/37.16 |
| 5,024,138 | 6/1991 | Sanderson et al. | 89/37.22 |
| 5,187,318 | 2/1993 | Sanderson et al. | 89/37.22 |

Primary Examiner—Stephen M. Johnson
Attorney, Agent, or Firm—Konneker & Bush

[57] ABSTRACT

An aircraft armament mounting system includes an elongated support plank member which is longitudinally insertable transversely through the aircraft cabin area so that a central portion of the plank is disposed within the cabin area with opposite end portions of the plank projecting outwardly from the aircraft. The central plank portion is suitably anchored within the cabin area, and the outwardly projecting plank end portions are configured to removably support machine guns supplied with belted ammunition from magazine boxed secured to the top side of the central plank portion within the cabin area. Auxiliary plank sections are pivotally secured to the front and rear side edges of the outer plank end portions and may be locked in a cargo carrying orientation in which the auxiliary plank sections extend forwardly and rearwardly from the front and rear side edges of the outer plank end portions. Cargo may be placed atop the locked auxiliary plank sections and secured thereon using tie-down straps or other suitable securement structures. Each auxiliary plank section may be unlocked from its cargo carrying orientation and pivoted upwardly onto the top side of its associated outer plank end portion from which it transversely extends. A portion of the structure used to secure the auxiliary plank sections to the outer plank end portions is also used to mount the machine guns on the outer plank end portions.

13 Claims, 3 Drawing Sheets

SUPPORT PLANK-BASED EXTERNAL AIRCRAFT CARGO CARRYING APPARATUS

BACKGROUND OF THE INVENTION

The present invention generally relates to aircraft armament apparatus and, in a preferred embodiment thereof, more particularly relates to a support plank-based aircraft armament mounting system incorporating thereon apparatus for supporting various aircraft cargo externally of the aircraft.

The external mounting on aircraft of weaponry such as machine guns, rocket launchers and the like, particularly in retrofit applications, has heretofore carried with it a variety of structural, operational and safety limitations and disadvantages. As but one example, the external mounting of machine guns on a helicopter has previously entailed securing an outwardly projecting metal support tube to the helicopter and then mounting the gun on the tube. While this seems to be a fairly straightforward approach, unavoidable limberness in the support tube often led to firing inaccuracies in the mounted gun due to wobbling of its firing axis relative to the aircraft.

To a great extent these problems have been eliminated by using the honeycombed metal support plank structure illustrated and described in U.S. Pat. No. 5,024,138 to Sanderson et al. This support plank structure is transversely insertable through the cabin portion of the aircraft in a manner such that a longitudinally central portion of the support plank is disposed within the cabin area, and outer end portions of the plank project outwardly from opposite sides of the body of the aircraft. The central plank portion within the cabin area is removably anchored to the aircraft (which may be a helicopter or a fixed wing aircraft) and outer tip portions of the plank are vertically pivotable, along plank structure hinge lines, between fully extended positions and upwardly and inwardly folded transport or storage positions.

At the outer ends of these foldable tip portions are downwardly projecting outboard weaponry mounting structures which, using conventional bomb lug connector apparatus, are operative to removably support a pair of multiple tube rocket launchers at their bottom ends. Mounted on the undersides of the outwardly projecting plank end portions, inwardly of the foldable plank tips, are a pair of inboard support structures operative to removably support a pair of machine guns such as 7.62 mm "mini guns".

While the support plank-based aircraft armament system illustrated and described in U.S. Pat. No. 5,024,138 has proven to be structurally superior to metal tube-type weaponry support systems, the central portion of the support plank, together with the ammunition magazines mounted on the top side thereof, occupies a considerable amount of space in the aircraft cabin area through which the plank extends. This, in turn substantially reduces the amount of cargo that may be carried within the cabin area. In view of this, it would be desirable to provide the aircraft with additional cargo carrying space to compensate for at least some of cabin space lost due to the presence of the central plank section, and its associated ammunition magazines, therein. It is accordingly an object of the present invention to provide such additional cargo carrying space.

SUMMARY OF THE INVENTION

In carrying out principles of the present invention, in accordance with a preferred embodiment thereof, support plank-based armament apparatus is provided for an aircraft having a cabin area and comprises an elongated support plank member having a longitudinally central portion positioned between opposite end portions of the support plank member.

First means are provided for securing the longitudinally central portion of the support plank member to the aircraft, within the cabin area thereof, in a manner such that the opposite support plank member end portions project outwardly beyond opposite sides of the aircraft with first and second side edges of each of the opposite end portions respectively facing the front and rear ends of the aircraft. Second means are provided for operatively mounting weaponry, representatively 7.62 mm mini machine guns, 0.50 caliber machine guns, or 40 mm machine guns, on the opposite support member end portions.

In order to compensate for the loss of cabin area cargo space due to the central plank portion and its associated mounting structure disposed within the cabin area, third means are provided for supporting cargo on the outer support plank member end portions. For each of the outer support plank member end portions the third means include (1) first and second auxiliary plank sections each having top and bottom sides, (2) mounting means for removably securing each of the first and second auxiliary plank sections to a different one of the first and second side edges of the outer support plank member end portion for pivotal movement relative thereto between a cargo carrying orientation in which the auxiliary plank section horizontally extends transversely to the outer support plank member end portion, and a folded orientation in which the auxiliary plank section is pivoted upwardly onto the top side of the outer support plank member end portion, with its top side facing upwardly to form a support surface upon which a cargo item may be placed and secured, and (3) locking means for releasably locking each of the first and second auxiliary plank sections in its cargo carrying orientation.

In this preferred embodiment of the armament apparatus, means are also provided for releasably securing cargo items on the support surfaces of each of the first and second auxiliary plank sections at the opposite ends of the support plank member when the auxiliary plank sections are in their cargo carrying orientations. Representatively, these means for releasably securing cargo items include pluralities of tie-down eyes formed on opposite sides edges of each of the auxiliary plank sections, and elongated tie-down members extendable over cargo items carried on the auxiliary plank section support surfaces and connectable at their opposite ends to the tie-down eyes.

DETAILED DESCRIPTION

Figure 1:
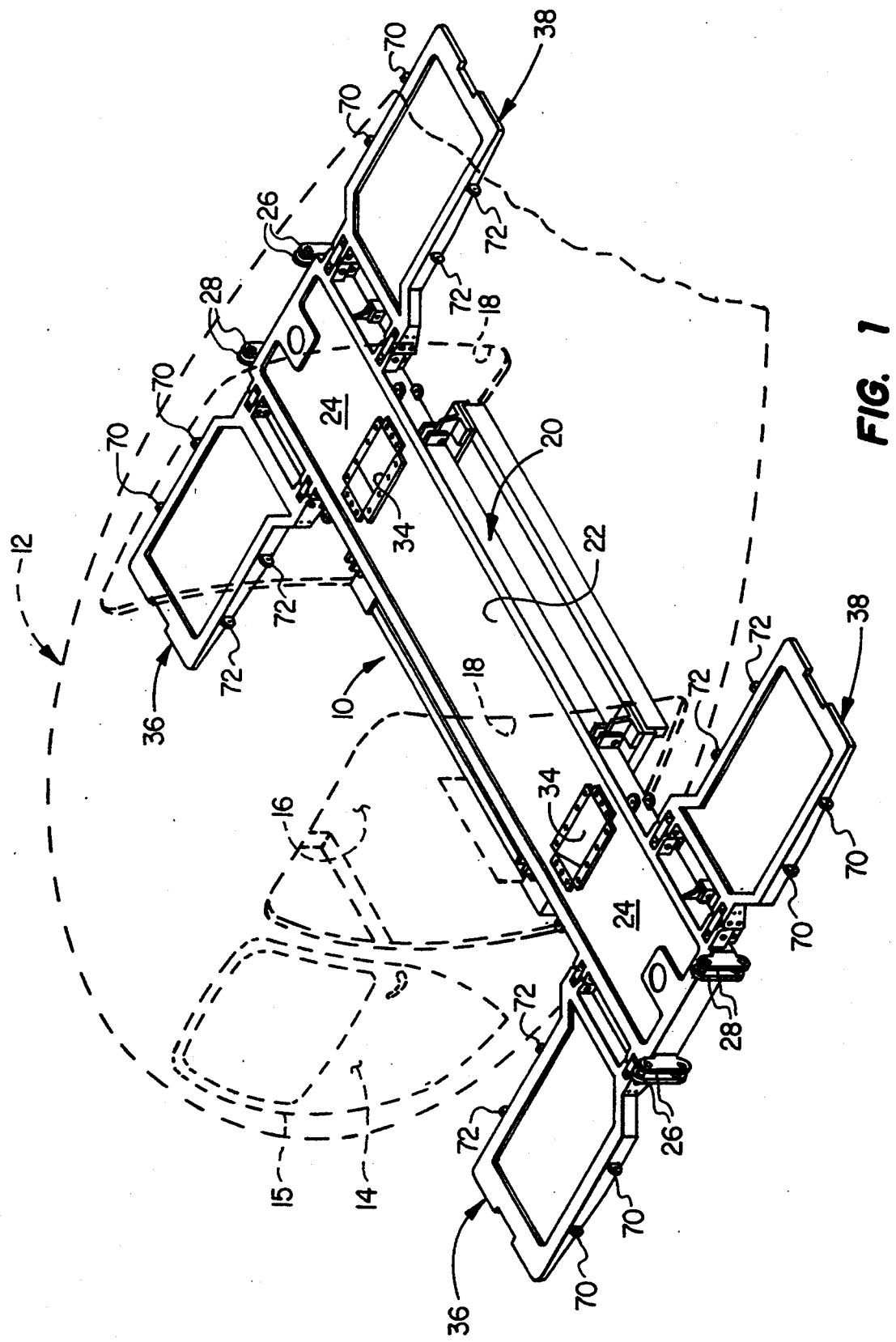
FIG. 1 is a phantomed perspective view of a front end portion of an aircraft, representatively a helicopter, having a cabin area through which an armament support plank transversely extends, the support plank having on outer end portions thereof specially designed external cargo carrying structures embodying principles of the present invention.
Figure 3:
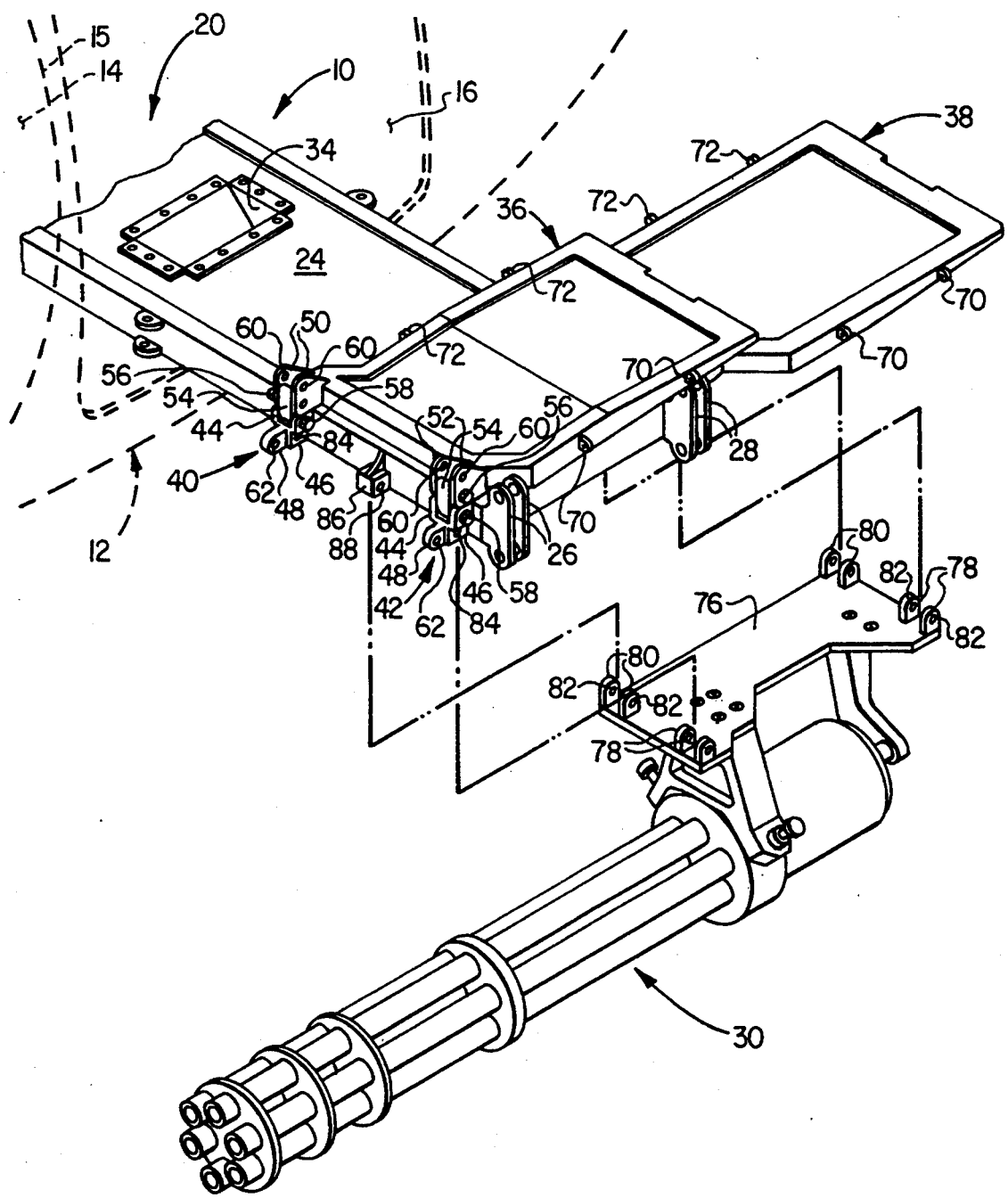
FIG. 3 is an exploded perspective view of the outer support plank end portion and a representative 7.62 mm "mini" machine mounted thereon, with a portion of the cargo carrying structure being pivoted onto the top side of the outer support plank end portion.

Referring initially to FIGS. 1 and 3, the present invention provides improved armament apparatus 10 which is operatively connected to a representative helicopter 12 having a cockpit area 14, with doors 15, positioned forwardly of a cabin area 16 having door openings 18. The armament apparatus 10 includes an elongated metal support plank member 20 which is longitudinally extended transversely through the cabin area 16, through the door openings 18, and has a central longitudinal portion 22 which is anchored to the floor of the cabin area 16. With the unique exceptions noted below, the support plank 20 is similar to the support plank illustrated and described in U.S. Pat. No. 5,024,138 which is hereby incorporated by reference herein.

Outer end portions 24 of the support plank 20 project outwardly from opposite sides of the helicopter body 30 and have, on their outer end corners, mounting lug pairs 26,28. These lug pairs are mateable with corresponding lug pairs on outer tip sections of the plank (not shown) to pivotally mount the tip sections on the outer end portions 24 of the plank 20 as illustrated and described in U.S. Pat. No. 5,024,138.

As subsequently described herein, a pair of 7.62 mm "mini" machine guns 30 (only one of which is shown in FIG. 3) are removably mounted on the undersides of the outer plank end portions 24. Alternatively, 0.50 caliber machine guns, 40 mm machine guns, or other types of weaponry could be mounted on the plank end portions 24. The mounted machine guns 30 are supplied with belted ammunition (not shown) from two ammunition magazine boxes 32 secured to the top side of the intermediate plank portion 22 within the cabin area 16 and illustrated in phantom in FIG. 4. Belted ammunition from the magazine boxes 32 is passed downwardly through a pair of rectangular openings 34 formed in the outer plank end portions 24 and then appropriately routed to the machine guns depending from the outer plank end portions 24 outboard of the plank openings 34.

Figure 4:
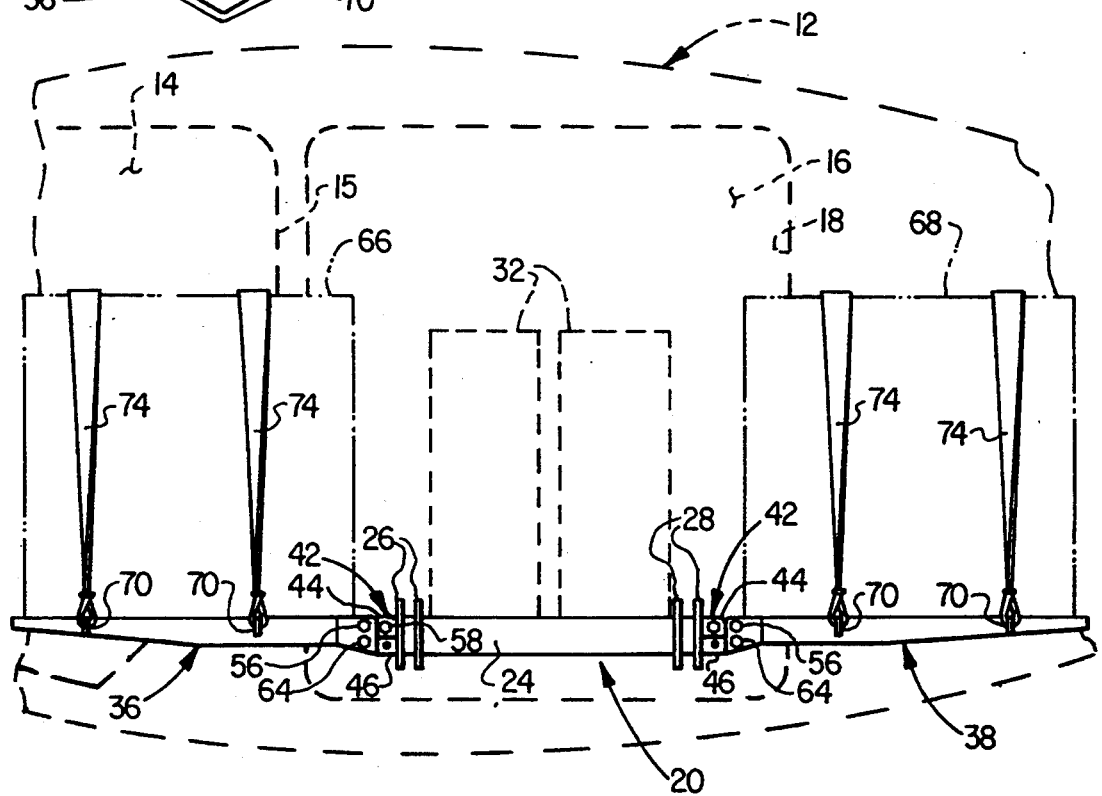
FIG. 4 is an enlarged scale outer end view of the outer support plank end portion as shown in FIG. 2, with representative cargo being operatively supported on its cargo carrying structure.

As can be seen in FIG. 4, the plank 20 and its associated ammunition magazine boxes 32 occupy a considerable space within the cabin area 16—space that could otherwise be used to carry various cargo within the helicopter 12. The present invention uniquely compensates for this loss of interior cargo space by incorporating in the overall armament support plank structure 20 auxiliary apparatus for externally supporting cargo.

As illustrated in FIGS. 1-4, this auxiliary cargo support apparatus includes, at each of the opposite ends of the illustrated plank structure 20, a pair of elongated rectangular auxiliary metal plank sections 36,38. In a manner subsequently described, the auxiliary plank sections 36,38 are removably secured at inner ends thereof to front and rear side edge portions of the outer plank end portions 24, outboard of the plank openings 34, and longitudinally extend transversely to the plank 20. The auxiliary plank sections 36 and 38, which are disposed externally of the helicopter on opposite sides thereof, may be locked in their cargo support orientations shown in FIGS. 1, 2 and 4, and may also be selectively pivoted (one at a time) upwardly onto the top side of their associated outer plank end portion 24. For example, as illustrated in FIG. 3, either of the forwardly projecting auxiliary plank sections 36 may be upwardly pivoted in this manner to provide access to the adjacent cockpit door 15.

Figure 2:
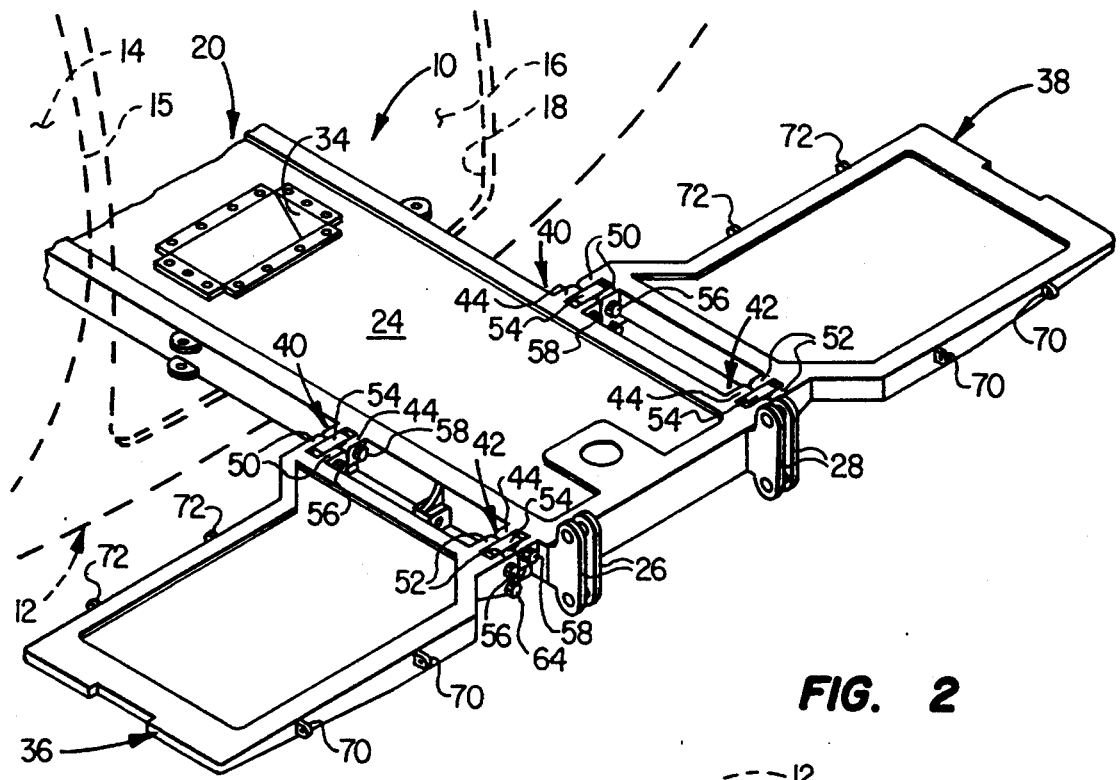
FIG. 2 is an enlarged scale perspective view of one of the support plank outer end portions and the cargo carrying structures mounted thereon.

Referring now to FIGS. 2 and 3, to pivotally mount the auxiliary plank sections 36,38 on the outer plank end portions 24, spaced apart inboard and outboard mounting lug structures 40,42 are formed on the front and rear side edges of the outer plank end portions 24 outboard of the plank openings 34. Each of the lug structures 40,42 has an upper yoke portion 44, and a base portion 46 from which a tab section 48 outwardly projects. Pairs of mounting lugs 50,52 are formed on the inner end corners of each of the auxiliary plank sections 36,38 with each of the lug pairs 50,52 receiving and being pivotally secured to one end of a pivot member 54 by a pin 56. The opposite end of each pivot member 54 is received in one of the yoke portions 44 and pivotally secured therein by a retaining pin 58.

Each of the mounting lug pairs 50 and 52 have an aligned pair of circular holes 60 therein (see FIG. 3). When the auxiliary plank sections 36 and 38 are downwardly pivoted to their FIG. 2 cargo carrying orientation the tab sections 48 are received between the lug pairs 50 and 52, and the holes 60 in each of the lug pairs 50 and 52 are aligned with a circular hole 62 in their associated tab section 48. The auxiliary plank sections 36 and 38 may then be locked in place using retaining pins 64 (see FIGS. 3 and 4) inserted through the adjacent hole sets 60 and 62.

Any of the auxiliary plank sections 36 and 38 may be pivoted upwardly onto the top side of its associated outer plank end portion 24, as illustrated in FIG. 3) simply by removing its retaining pins 64. If desired, any of the auxiliary plank sections 36,38 may be removed from its associated outer plank end portion 24 by additionally removing the pins 58.

As illustrated in FIG. 4, with the auxiliary plank sections 36,38 pivoted downwardly to and locked in their outwardly projecting cargo carrying orientations, cargo such as the representatively illustrated cargo boxes 66,68 may be respectively placed atop the plank sections 36,38. A spaced pair of mounting eyes 70 are formed on the outboard side edge of each of the auxiliary plank sections 36 and 38, and a spaced pair of mounting eyes 72 are formed on the inboard side edge of each of the auxiliary plank sections. To releasably secure the cargo boxes 66,68 atop the auxiliary plank sections 36,38 elastomeric tie-down straps 74 are stretched over the tops of the boxes 66,68 as illustrated in FIG. 4 and secured at their opposite ends to the outboard and inboard mounting eyes 70,72.

As can be seen, the addition of the auxiliary plank sections 36,38 to the overall armament support plank structure permits the plank structure to provide external cargo carrying space compensating for the reduction in cabin area cargo storage space created by the presence within the cabin area of the central plank section 22 and its associated ammunition magazine boxes 32. While the improved plank structure of the present invention has been representatively illustrated as being incorporated in a helicopter, it will be readily appreciated that it also could be advantageously be incorporated in other types of aircraft such as a fixed wing aircraft.

According to another feature of the present invention, the means for releasably and pivotally securing the auxiliary plank sections 36,38 to the forward and rear side edges of the outer plank end portions 24 also are used as part of mounting means for releasably supporting the illustrated machine gun 30 (or other weaponry) on the underside of the outer plank end portions 24. These mounting means include a deck plate structure 76 (see FIG. 4) secured to the top side of the gun 30 and having spaced pairs of upwardly projecting mounting lugs 78,80 respectively formed on its outboard and inboard sides and having circular openings 82 extending therethrough; circular openings 84 formed in the yoke base portions 46 inwardly of their tab sections 48; and intermediate mounting lugs 86 formed on the forward and rear side edges of each outer plank end portion 24 between the inboard and outboard mounting lug structures 40,42 thereon.

Illustratively, the machine gun 30 shown in FIG. 3 is removably secured to the underside of the depicted outer plank end portion 24 by positioning the intermediate mounting lugs 86 on the front and rear side edges of the plank end portion 24 respectively between the forward and rear lug pairs 80 of the deck plate 76; positioning the forward and rear side yoke bases 46 respectively between the forward and rear lug pairs 78 of the deck plate; and then anchoring the deck plate 76 in place by inserting retainer pins (not shown) through the hole sets 82,84 and 82,88. Alternatively, the deck plate lug pairs 78,80 could be connected to the inboard lug structures 40 and the intermediate lugs 86 to mount the machine gun 30 somewhat closer to the side of the helicopter body if desired.

The foregoing detailed description is to be clearly understood as being given by way of illustration and example only, the spirit and scope of the present invention being limited solely by the appended claims.

What is claimed is:

1. Armament apparatus for an aircraft having a cabin area, comprising:
    an elongated support plank member having a longitudinally central portion positioned between opposite end portions of said support plank member;
    first means for securing said longitudinally central portion of said support plank member to the aircraft, within the cabin area thereof, in a manner such that said opposite end portions of said support plank member project outwardly beyond opposite sides of the aircraft with first and second side edges of each of said opposite end portions respectively facing the front and rear ends of the aircraft, each of said opposite end portions having a top side;
    second means for operatively mounting weaponry on each of said opposite end portions of said support plank member; and
    third means for supporting cargo on said outer support plank member end portions, said third means, for each of said outer support plank member end portions, including:
        first and second auxiliary plank sections each having top and bottom sides, and
        mounting means for removably securing each of said first and second auxiliary plank sections to a different one of said first and second side edges of the outer support plank member end portion for pivotal movement relative thereto between a cargo carrying orientation in which the auxiliary plank section extends horizontally transversely to the outer support plank end portion, with the top side of the auxiliary plank section facing upwardly and defining a cargo item support surface, and a folded orientation in which the auxiliary plank section is pivoted upwardly onto the top side of the outer support plank end portion, and
    locking means for releasably locking each of said first and second auxiliary plank sections in said cargo carrying orientation thereof.

2. The armament apparatus of claim 1 wherein:
    each of said first and second auxiliary plank sections has a generally rectangular configuration elongated in a direction transverse to the longitudinal direction of said support plank member.

3. The armament apparatus of claim 1 wherein said first and second auxiliary plank sections have inner ends, and said mounting means include:
    longitudinally spaced apart first and second mounting lug structures secured to the first and second side edges of each of said opposite end portions of said plank member, each of said first and second mounting lug structures having a yoke portion,
    spaced apart lug pairs secured to each of said inner ends of said first and second auxiliary plank sections, and
    means for pivotally connecting each of said auxiliary plank section lug pairs to a different one of said first and second yoke portions.

4. The armament apparatus of claim 3 wherein, for each associated lug pair and yoke portion, said means for pivotally connecting include:
    a pivot member having a first end pivotally received and secured between the lug pair, and a second end pivotally received and secured in the yoke portion.

5. The armament apparatus of claim 4 wherein:
    each of said first and second mounting lug structures on the first and second side edges of said opposite end portions of said plank member has an outwardly projecting tab section positioned to be received between one of said lug pairs on said inner ends of said first and second auxiliary plank sections when the plank sections are in said cargo carrying orientations thereof, and
    said locking means include means for releasably locking said lug pairs to the tab sections received therein when said first and second auxiliary plank sections are in said cargo carrying orientations thereof.

6. The armament apparatus of claim 3 wherein:
    said armament apparatus further comprises a weapon having a mounting plate with a top side and opposite ends, and
    said second means include depending base sections formed on said yoke portions, intermediate mounting lugs secured to said first and second side edges of said opposite end portions of said support plank member between said first and second mounting lug structures thereon, spaced first and second lug pairs secured to each end of said mounting plate and projecting upwardly from said top side thereof, said first lug pairs on said mounting plate being adapted to receive said base sections of said first mounting lug structures on one of said opposite end portions of said plank member, and said second lug pairs on said mounting plate being adapted to receive said intermediate mounting lugs on said one of said opposite end portions of said support plank member, and means for releasably locking said first lug pairs on said mounting plate to their received base sections, and for releasably locking said second lug pairs on said mounting plate to their received intermediate mounting lugs.

7. The armament apparatus of claim 6 wherein:
said weapon is a machine gun.

8. The armament apparatus of claim 1 further comprising:
means for releasably securing cargo items on said support surfaces of said first and second auxiliary plank sections when said first and second auxiliary plank sections are in said cargo carrying orientations thereof.

9. The armament apparatus of claim 8 wherein:
each of said first and second auxiliary plank sections has opposite side edges extending transversely to the longitudinal direction of said support plank member, and
said means for releasably securing cargo items include pluralities of tie-down eyes formed on said opposite side edges of each of said first and second auxiliary plank sections, and elongated tie-down members extendable over cargo items carried on the auxiliary plank section support surfaces and connectable at their opposite ends to said tie-down eyes.

10. Armament apparatus for an aircraft having a cabin area, comprising:
an elongated support plank member having a longitudinally central portion positioned between opposite first and second end portions of the plank member upon which weaponry may be supported;
means for securing said longitudinally central portion of said support plank member to the aircraft, within the cabin area thereof, in a manner such that said opposite first and second end portions of said support plank member project outwardly beyond opposite sides of the aircraft with first and second side edges of each of said opposite end portions respectively facing the front and rear ends of the aircraft; and
means for supporting cargo on said first support plank member end portion, said means for supporting cargo including:
an auxiliary plank section having top and bottom sides,
mounting means for removably securing said auxiliary plank section to one of said first and second side edges of said first support plank member end portion for pivotal movement relative thereto, about an axis parallel to said one of said first and second side edges, between a cargo carrying orientation in which the auxiliary plank section horizontally extends transversely to said first outer support plank member end portion, with the top side of said auxiliary plank section facing upwardly and defining a cargo item support surface, and a folded orientation in which said auxiliary plank section is pivoted upwardly onto the top side of said first support plank member end portion, and
locking means for releasably locking said auxiliary plank section in said cargo carrying orientation thereof.

11. The armament apparatus of claim 10 wherein:
said auxiliary plank section has a generally rectangular configuration elongated in a direction transverse to the longitudinal direction of said support plank member.

12. The armament apparatus of claim 11 further comprising:
means for releasably securing said cargo item on said cargo item support surface when said auxiliary plank section is in said cargo carrying orientation thereof.

13. The armament apparatus of claim 12 wherein:
said auxiliary plank section has opposite side edges extending transversely to the longitudinal direction of said support plank member, and
said means for releasably securing said cargo item include pluralities of tie-down eyes formed on said opposite side edges, and elongated tie-down members extendable over a cargo item carried on said support surface and connectable at their opposite ends to said tie-down eyes.

* * * * *